US006369460B1

(12) United States Patent
Endoh et al.

(10) Patent No.: US 6,369,460 B1
(45) Date of Patent: Apr. 9, 2002

(54) POWER SUPPLY MONITORING APPARATUS FOR VEHICLE

(75) Inventors: Takeshi Endoh; Kouichi Takagi; Keizo Ikeda, all of Nagoya; Kazuhiro Aoki, Toyota, all of (JP)

(73) Assignees: Harness System Technologies, Ltd., Nagoya; Sumitomo Wiring Systems, Ltd., Mie; Sumitomo Electric Industries, Ltd., Osaka, all of (JP)

( * ) Notice: Subject to any disclaimer, the term of this patent is extended or adjusted under 35 U.S.C. 154(b) by 0 days.

(21) Appl. No.: 09/522,618

(22) Filed: Mar. 10, 2000

(30) Foreign Application Priority Data

Apr. 22, 1999 (JP) ............................................. 11-114665

(51) Int. Cl.[7] ................................................. H02J 1/00
(52) U.S. Cl. ......................... 307/31; 307/10.7; 320/132
(58) Field of Search .......................... 307/31, 10.1, 9.1, 307/10.7, 38, 39, 30; 320/132; 701/29; 439/34; 702/63, 57; 361/87, 93

(56) References Cited

U.S. PATENT DOCUMENTS 5,324,203 A * 6/1994 Sano et al. .................... 439/34
6,037,749 A * 3/2000 Parsonage ................... 320/132
6,144,110 A * 11/2000 Matsuda et al. ........... 307/10.1

FOREIGN PATENT DOCUMENTS

| JP | A-5-208645 | 8/1993 |
| JP | U-5-74982 | 10/1993 |
| JP | A-8-99577 | 4/1996 |
| JP | A-9-23589 | 1/1997 |
| JP | Y2-2564199 | 11/1997 |
| JP | A-10-68754 | 3/1998 |

* cited by examiner

Primary Examiner—Josie Ballato
Assistant Examiner—Robert L. Deberadinis
(74) Attorney, Agent, or Firm—Oliff & Berridge, PLC

(57) ABSTRACT

A power supply monitoring apparatus, for which a plurality of different preset reference current values and corresponding permitted times are provided, includes: a cutoff device; current detection circuits; overcurrent detection circuits; an idle-up command circuit; and a low voltage detection circuit. When an overcurrent detection circuit detects a current value equaling or exceeding at least one of the preset reference current values, and when that condition continues for a time equaling or exceeding a permitted time corresponding to the pertinent reference current value, the circuit transmits a command to the cutoff device to interrupt the current supplied to a power feeding path. Further, when the idle-up command circuit detects an increase in a supplied current, an idle-up command is issued.

5 Claims, 7 Drawing Sheets

POWER SUPPLY MONITORING APPARATUS FOR VEHICLE

BACKGROUND OF THE INVENTION

1. Field of the Invention

The present invention relates to an apparatus that monitors the state of a battery based power supply, which provides an operating power for electric appliances installed in a vehicle.

2. Description of the Related Art

In recent times, electric appliances (electric devices), such as televisions, food heating/chilling units and vacuum cleaners, have tended more and more to be included as installed equipment in vehicles. To operate such electric appliances in a vehicle, power is generally supplied via a cigarette lighter socket, or via a plurality of specially provided power supply outlets (accessory outlets), and as a result, to operate such electric devices there has been a corresponding increase in the battery supplied power that is required. Under the circumstances, to protect batteries in vehicles and to prevent them from being damaged, monitoring apparatuses have had to be employed for controlling, an halting when necessary, the supply of power to electric, vehicular appliances.

A conventional example is a vehicle power supply monitoring apparatus disclosed in Japanese Patent Unexamined Publication No. Hei. 5-208645. This monitoring apparatus comprises: a current monitoring circuit, for halting the supply of power along a power feeding path leading to a power supply outlet when the current flowing through the power supply outlet exceeds a setup value; and a voltage monitoring circuit, for halting the supply of power along the power feeding path to the power supply outlet when the output voltage at a battery has been reduced and is less than or equals a lower setup voltage limit. The current monitoring circuit and the voltage monitoring circuit protect the battery from overcurrents and from reductions in the output voltage.

The conventional monitoring apparatus halts the supply of power when an overcurrent is detected and a current value exceeds a predetermined setup value.

Actually, the loads connected to power supply outlets in a vehicle comprise a variety of electric appliances, such as lamps and motors. Therefore, although for a short period of time a current, such as a lash current or a motor-lock current, at a power supply outlet may frequently equal or exceed a rated current, since the time span for a lash current or for a motor-lock current is very brief, the load imposed on a battery is small and the current flowing along a power feeding path need not be interrupted.

Therefore, in order that a large current, such as a lash current that flows for a brief period of time, is not detected, for the conventional monitoring apparatus a setup value must be set that equals or exceeds a lash current value. As a result, the setup value becomes too large and a battery can not be effectively protected from an overcurrent, and the consumption, due to an overcurrent, of the power stored in a battery that is less than or that equals the setup value can not be prevented.

Further, the conventional monitoring apparatus is so designed that it does not interrupt a current flowing along a power feeding path until the output voltage of the battery providing the current has been reduced and equals or is less than the lower voltage limit, or unless a current equaling or exceeding a setup value has flowed to an electric appliance. Therefore, when the amount of current that is supplied is increased within a range that is smaller than the setup value, a reduction in the voltage output by the battery can not be prevented.

SUMMARY OF THE INVENTION

To resolve the above problem, it is a first object of the invention to provide a power supply monitoring apparatus for vehicle that can effectively protect a battery from overcurrents, and that can prevent, within a required range for battery protection, placing limits on the employment of electric appliances.

It is a second object of the invention to provide a power supply monitoring apparatus for vehicle that can prevent the excessive consumption of the power stored in a battery by an increase in the currents that are supplied.

In order to achieve the above objects, according to the invention, there is provided a power supply monitoring apparatus for vehicle, which monitors the state of a power supplied by a battery to an electric appliance, comprising: a cutoff unit, which is located along a power feeding path between the battery and the electric appliance, for interrupting a current flowing along the power feeding path; a current detector for detecting the value of a current flowing across the electric appliance; and a first command unit, for which a plurality of different reference current values and a plurality of corresponding permitted times are set, for detecting a condition wherein the value of the current detected by the current detector equals or exceeds at least one of the plurality of the reference current values, is continued for a period that equals or exceeds one of the plurality of the permitted times that corresponds to the reference current value, and for outputting a command to the cutoff unit to interrupt the current flowing along the power feeding path.

DETAILED DESCRIPTION OF THE PREFERRED EMBODIMENTS

Figure 1:
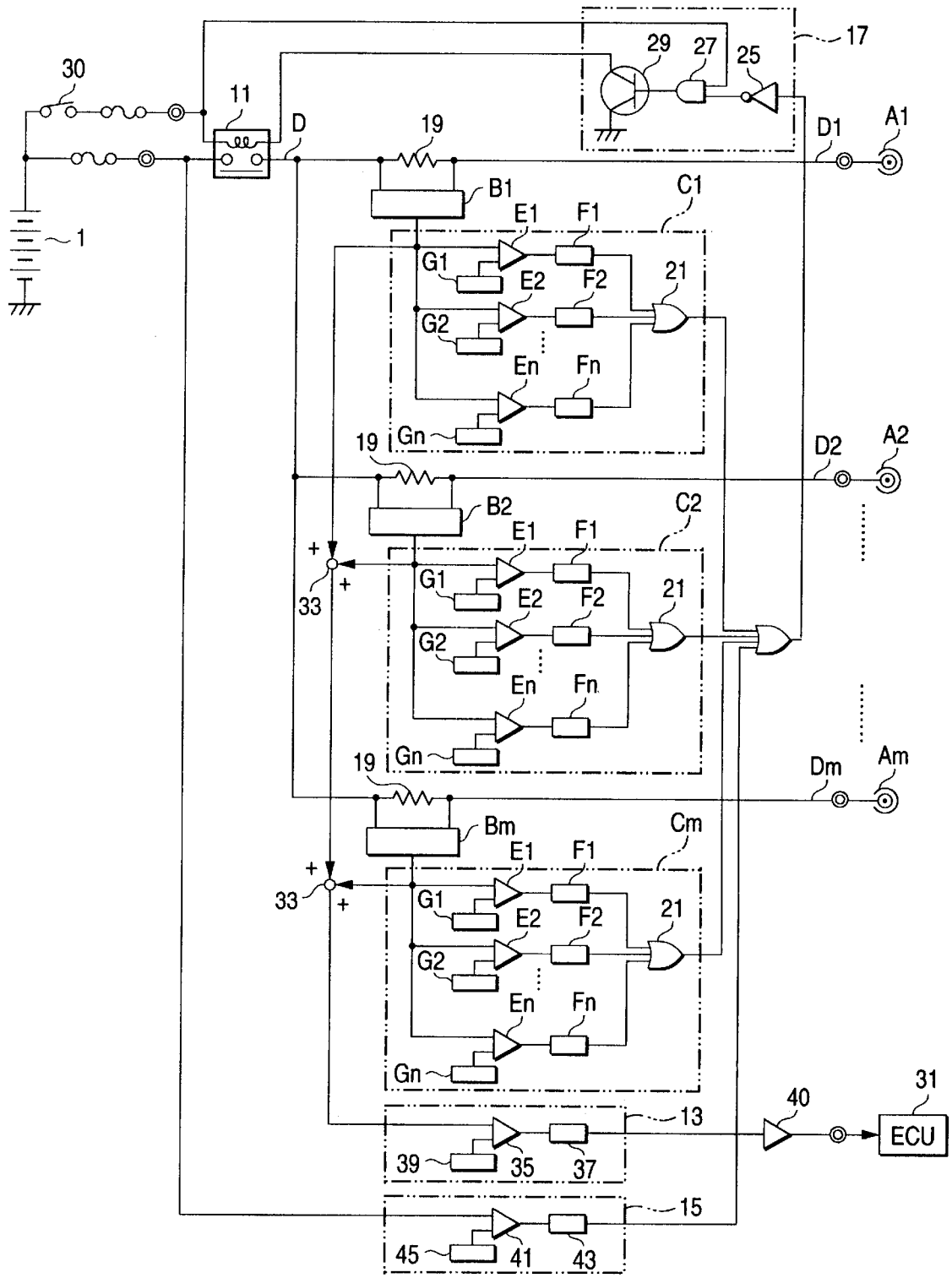
FIG. 1 is a block diagram illustrating a vehicle power supply monitoring apparatus according to a first embodiment of the invention.

FIG. 1 is a block diagram illustrating a power supply monitoring apparatus for vehicle according to a first embodiment of the invention. The monitoring apparatus monitors the state of the power supplied by power supply outlets (connectors) A1 to Am, such as a cigarette lighter outlet, that are connected to a battery 1. The monitoring apparatus comprises: a cutoff device (cutoff unit) 11; a plurality of current detection circuits (current detectors) B1 to Bm and overcurrent detection circuits (first command units) C1 to Cm, which are provided for the individual power supply outlets A1 to Am; an idle-up command circuit (idle-up command unit) 13; a low voltage detection circuit (second command unit) 15; and a drive circuit 17 for driving the cutoff device 11. The power supply outlets A1 to Am are installed in a vehicle, and power reception plugs of various electric appliances are detachably connected to the outlets A1 to Am.

The cutoff device 11 is a relay, located along a power feeding path D extending from the battery 1 to the power supply outlets A1 to Am, that under the control of the drive circuit 17 interrupts or permits the flow of a current along the power feeding path D. While in this embodiment a relay is employed as the cutoff device 11, a switching element, such as a transistor (e.g., an FET (field-effect transistor)) maybe employed instead. Downstream of the cutoff device 11, the power feeding path D branches into a plurality of paths D1 to Dm, to which the power supply outlets A1 to Am are connected.

The current detection circuits B1 to Bm detect the values of currents that flow along the paths D1 to Dm and through the power supply outlets A1 to Am, and output the detected current values as signals.

The overcurrent detection circuits C1 to Cm detect overcurrents based on the values detected by the current detection circuits B1 to Bm, and operate the cutoff device 11 via the drive circuit 17. Each of the overcurrent detection circuits C1 to Cm includes a plurality of comparators E1 to En, corresponding filter circuits (timer circuits) F1 to Fn, and an OR gate 21.

The comparators E1 to En determine the presence of an overcurrent based on the magnitude of a current, and reference levels G1 to Gn, which are set for the comparators E1 to En, represent the different reference current values that are used to determine the presence of an overcurrent. The comparators E1 to En compare the levels of signals output by corresponding current detection circuits B1 to Bm with the reference levels G1 to Gn that have been set. When the level of an input signal is lower than a corresponding reference level G1 to Gn, a low-level signal is output. While when an input signal level equals or exceeds a corresponding reference level G1 to Gn, a high-level signal is output.

The filter circuits F1 to Fn are provided to determine the presence of an overcurrent based on the length of time a current flows, and permitted flow times are set for the filter circuits F1 to Fn that correspond to the reference current values provided for the corresponding comparators E1 to En. The filter circuits F1 to Fn generally output low-level signals, and output high-level signals only when they receive high-level signals continuously for a length of time that equals or exceeds the permitted times set for corresponding comparators E1 to En. The initial state wherein the filter circuits F1 to Fn output high-level signals is stored for a period during which an accessory switch 30 is on, for example, and is thereafter restored when the accessory switch 30 is turned off.

When the OR gate 21 receives a high-level signal from at least one of the filter circuits F1 to Fn, the OR gate 21 changes the output signal level from low to high. And when a high-level signal is output by the OR gate 21, the cutoff device 11 is halted, a process which will be described later.

Now, while referring to Table 1 and FIG. 2, an explanation will be given for an example wherein a plurality of reference current values and permitted times are set for overcurrent detection circuits C1 to Cm. In this example, as in Table 1, five reference current values I1 to I5 and five permitted times T1 to T5 are respectively set for the comparators E1 to En and the filter circuits F1 to Fn that are provided for each of the overcurrent detection circuits C1 to Cm.

[TABLE 1]

| Condition | I | II | III | IV | V |
| --- | --- | --- | --- | --- | --- |
| Reference current value [A] | I1 | I2 | I3 | I4 | I5 |
| Permitted time [s] | T1 | T2 | T3 | T4 | T5 |

Figure 2:
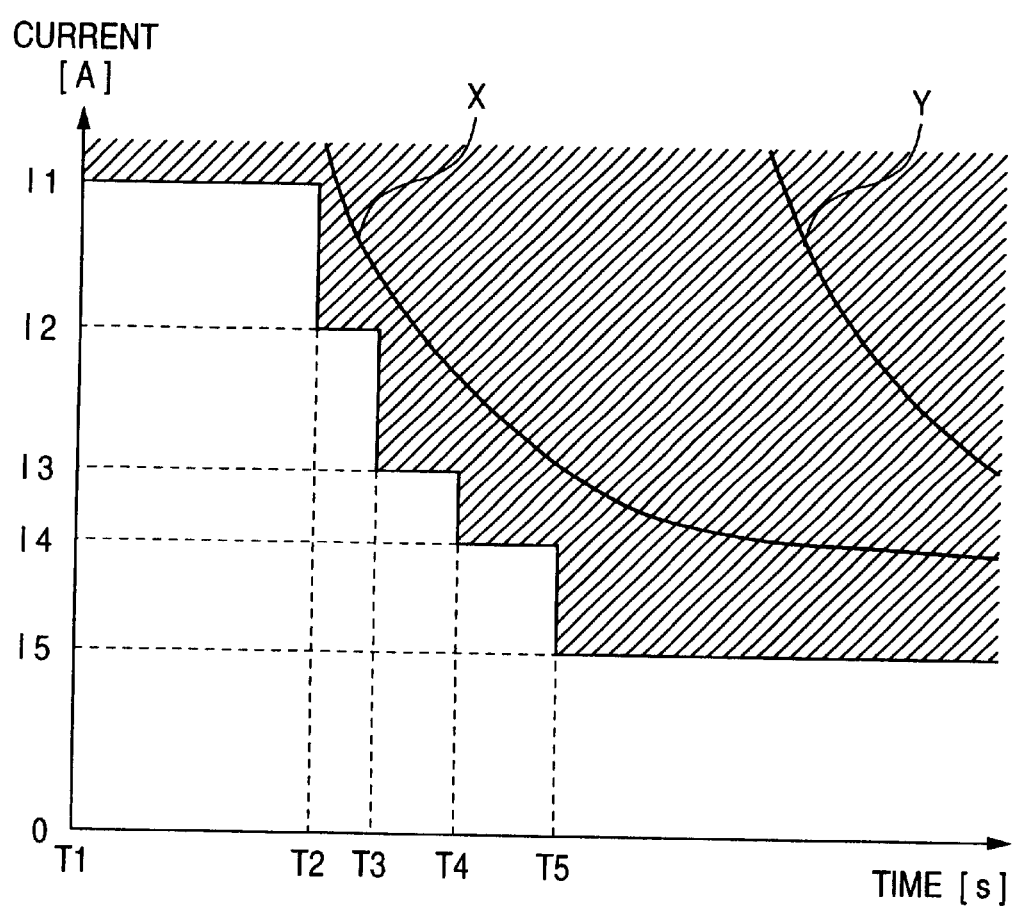
FIG. 2 is a graph showing a plurality of reference current values and a plurality of permitted times that are set in the power supply monitoring apparatus in FIG. 1 and are used to determine whether an overcurrent has occurred.

The hatched area in FIG. 2 represents the zone in the example in which the overcurrent detection circuits C1 to Cm detect an overcurrent. Graph line X describes the blowout characteristic of a fuse of 15A, and graph line Y describes the smoke characteristic of a copper line having a diameter of 0.85 mm. That is, as is shown in FIG. 2, in this embodiment the five reference current values I1 to I5 and the permissive times T1 to T5 are set to simulate the blowout characteristic of the fuse 15A. The permitted time T1 for the reference current value I1 is set to 0, and when the values of the currents flowing through the power supply outlets A1 to Am equal or exceed the reference current value I1, the cutoff device 11 is immediately halted.

In this embodiment, the five reference current values I1 to I5 and the permitted times T1 to T5 are set to simulate the blowout characteristic of the fuse 15A. However, the reference current values and the permitted times may also be set to simulate the smoke characteristic of the copper line having a diameter of 0.85 mm.

In consonance with the sum obtained for the currents flowing through the power supply outlets A1 to Am, the idle-up command unit 13 detects an increase in the amount of the current that is supplied and outputs, at a predetermined level, an idle-up command to the engine control unit 31. For this process, the idle-up command unit 13 includes an addition circuit 33, a comparator 35 and a filter circuit 37.

The addition circuit 33 adds together current values detected and output in signals by the current detection circuits B1 to Bm, and outputs the obtained sum in a signal.

A reference level 39, which represents a reference current value and which is used to make an idle-up determination, is set for the comparator 35 that, in consonance with the magnitude of a current, determines whether or not an idle-up is required. Later, when the comparator 35 receives the signal output by the addition circuit 33, it compares the level of the received signal with the reference level 39. As a result, when the level of the received signal is lower than the reference level 39, a low-level signal is output, while when the level of the received signal equals or exceeds the reference level 39, a high-level signal is output.

The filter circuit 37 employs the length of the current flow time to determine whether an idle-up is required, and the permitted time that corresponds to the reference current value established for the comparator 35 is set for the filter circuit 37. Generally, the filter circuit 37 outputs a low-level signal, and only when a high-level signal is continuously received over a period that equals or exceeds the permitted time that is set for the comparator 35 does the filter circuit 37 output a high-level signal (for an idle-up command). The state of the filter circuit 37 while outputting a high-level signal is stored for a period during which the accessory switch 30 is on. Then, when the accessory switch is turned off, the filter circuit 37 is reset to the initial state.

In this embodiment, the idle-up reference is determined by the reference current value set for the comparator 35 and the permitted time set for the filter circuit 37.

The signal output by the filter circuit 37 is transmitted via an amplifier 40 to the engine control unit 31. When a high-level signal is output by the filter circuit 37, the engine control unit 31 performs an idle-up at a predetermined level, and as a result, the power generated by an alternator is increased by a predetermined amount.

The low voltage detection circuit 15, which is so designed that it can detect a reduction in a battery voltage and can interrupt the current at the cutoff device 11, includes a comparator 41 and a filter circuit 43. The comparator 41 is connected to the power feeding path D, upstream of the cutoff device 11. At the juncture with the power feeding path D, the comparator 41 detects the voltage output by the battery 1 and compares it with the voltage output in consonance with the reference voltage value indicated by a reference level 45. When the output voltage is lower than the reference voltage value, a low-level signal is output. While when the output voltage equals or exceeds the reference voltage value, a high-level signal is output.

A predetermined permitted time is set for the filter circuit 43, which generally outputs a low-level signal, and which outputs a high-level signal only when it continuously receives a high-level signal from the comparator 41 over a period that equals or exceeds the permitted time. The state of the filter circuit 43 when it outputs a high-level signal is stored for a period during which the accessory switch 30 is on. Then, when the accessory switch 30 is turned off, the filter circuit 43 is reset to the initial state.

The drive circuit 17 controls the cutoff device 11 in accordance with the signal output by the OR gate 21 in each overcurrent detection circuit C1 to Cm, the output signal of the filter circuit 43 in the low voltage detection circuit 15, and an accessory power signal that will be described later. The drive circuit 17 includes an OR gate 23, an inverter 25, an AND gate 27, and a transistor 29.

The conductive and non-conductive states of the cut-off device 11 are switched by rendering the transistor 29 on or off. The on/off state of the transistor 29 is controlled by the signal output by the AND gate 27.

The signals output by the overcurrent detection circuits C1 to Cm and the low voltage detection circuit 15 are transmitted to the OR gate 23, while the output signal of the OR gate 23 is transmitted via the inverter 25 to one of the input terminals of the AND gate 27. An accessory power signal, which goes high and low as the accessary switch 30 is turned on and off, is transmitted to the other input terminal of the AND gate 27. The cutoff device 11 is controlled by these two signals that are received by the AND gate 27.

The operation performed by the power supply monitoring apparatus will now be described. When the accessory switch 30 is turned on, a high-level accessory power signal is transmitted to one of the input terminals of the AND date 27 in the drive circuit 17. Concurrently, in the normal state wherein an overcurrent or a reduction in the output voltage of the battery 31 does not occur, low-level signals are output by both the overcurrent detection circuits C1 to Cm and by the voltage reduction detection circuit 15, and are transmitted to the OR gate 23, which outputs a high-level signal that is transmitted, via the inverter 25, to the other input terminal of the AND gate 27.

As a result, the transistor 29 is rendered on, and the circuitry, which is extended from the positive terminal of the battery 1 to the accessary switch 30, the solenoid coil of the cutoff device 11 and the transistor 29 and is grounded, is rendered on. Then, the solenoid coil of the cutoff device 11 is excited, and the contact point of the cutoff device 11 is turned on, so that the power feeding path D becomes conductive.

When the value of a current that flows through one of the power supply outlets A1 to Am exceeds the reference current value that is set in one of the comparators E1 to En of a corresponding overcurrent detection circuit C1 to Cm, and when the pertinent state is continued for a period equal to or longer than the permitted time set in the filter circuit F1 to Fn that corresponds to the specific comparator E1 to En, the signal that is output by the filter circuit F1 to Fn is changed from low to high. And accordingly, the level of the signal output by the OR gate 21 for the overcurrent detection circuit C1 to Cm that corresponds to the specific power supply outlet A1 to Am is changed from low to high, and level of the signal output by the OR gate 23 is likewise changed from low to high. As a result, the level of the signal output by the AND gate 27 is changed from high to low, the transistor 29 is rendered off, the cutoff device 11 is turned off, and the excessive consumption, due to the overcurrent, of the power stored in the battery 1 is prevented.

When the output voltage of the battery 1 falls until it equals or is less than the reference voltage value that is set in the comparator 41 of the voltage reduction detection circuit 15, and when the pertinent state is continued for a period equal to or longer than the permitted time that is set in the filter circuit 43, the level of the signal output by the filter circuit 43 is changed from low to high, and accordingly, the level of the signal output by the OR gate 23 is likewise changed from low to high. Then, the level of the signal output by the AND gate 27 is changed from high to low, the transistor 29 is rendered off, the cutoff device 11 is turned off, and the flow of power along the power feeding path D is interrupted. Thus, an excessive reduction in the output voltage of the battery 1 is prevented.

When the high-level signal is output by the filter circuits F1 to Fn and the filter circuit 43, the level of the signal output by the OR gate 23 is maintained high because the high-level output state is maintained until the accessory switch 30 is turned off. Therefore, once the cutoff device 11 is turned off, it is maintained in the OFF state until the accessory switch 30 is turned off and on again. When the accessory switch 30 is again turned on, the cutoff device 11 is also turned on.

Although the overcurrent detection circuits C1 to Cm do not detect the occurrence of an overcurrent, when the sum of the currents flowing through the power supply outlets A1 to Am has become equal to or greater than the reference current value that is set in the comparator 35 of the idle-up command unit 13, and when the pertinent state is continued for a period equal to or longer than the permitted time that is set in the filter circuit 37, the level of the signal output by the filter circuit 37 is changed from low to high. And accordingly, the idle-up process is performed by the engine control unit 31 at a predetermined level, and the power generated by the alternator is increased.

As is described above, according to the present invention, as is indicated by the hatched area in FIG. 2, the range wherein an overcurrent occurs is determined by using multiple reference current values and multiple corresponding permitted times. Thus, the battery 1 can be effectively protected from an overcurrent across a wide range extending from an overcurrent that has a comparatively small value to an overcurrent that has a comparatively large value. In addition, a large current, such as the lash current, can be supplied for a short period of time in the permitted range for the battery 1, so that the imposition of limitations on the employment of an electric appliance can be avoided within a range wherein the protection provided for the battery 1 is not degraded.

When the state wherein the sum of the currents flowing through the power supply outlets A1 to Am equals or exceeds the predetermined reference current value, and when this state continues for a period that equals or exceeds the permitted time, the idle-up process is performed, and the power generated by the alternator is increased. Therefore, the power charge held by the battery 1 can be prevented from becoming exhausted due to the increase in the current flowing through the power supply outlets A1 to Am.

When the state wherein the output voltage of the battery 1 is less than or equals the predetermined reference voltage value, and when this state continues for a period that equals or exceeds the predetermined permitted time, the current flow along the power feeding path D is interrupted. Thus, the excessive consumption of the power stored in the battery 1 can be prevented.

In this embodiment, each of the current detection circuits B1 to Bm is paired with a corresponding overcurrent detection circuit C1 to Cm, and one such pair is provided for each of the power supply outlets A1 to Am. However, a pair consisting of one of the current detection circuits B1 to Bm and one of the overcurrent detection circuits C1 to Cm may be also be provided for a predetermined number of power supply outlets A1 to Am.

Figure 3:
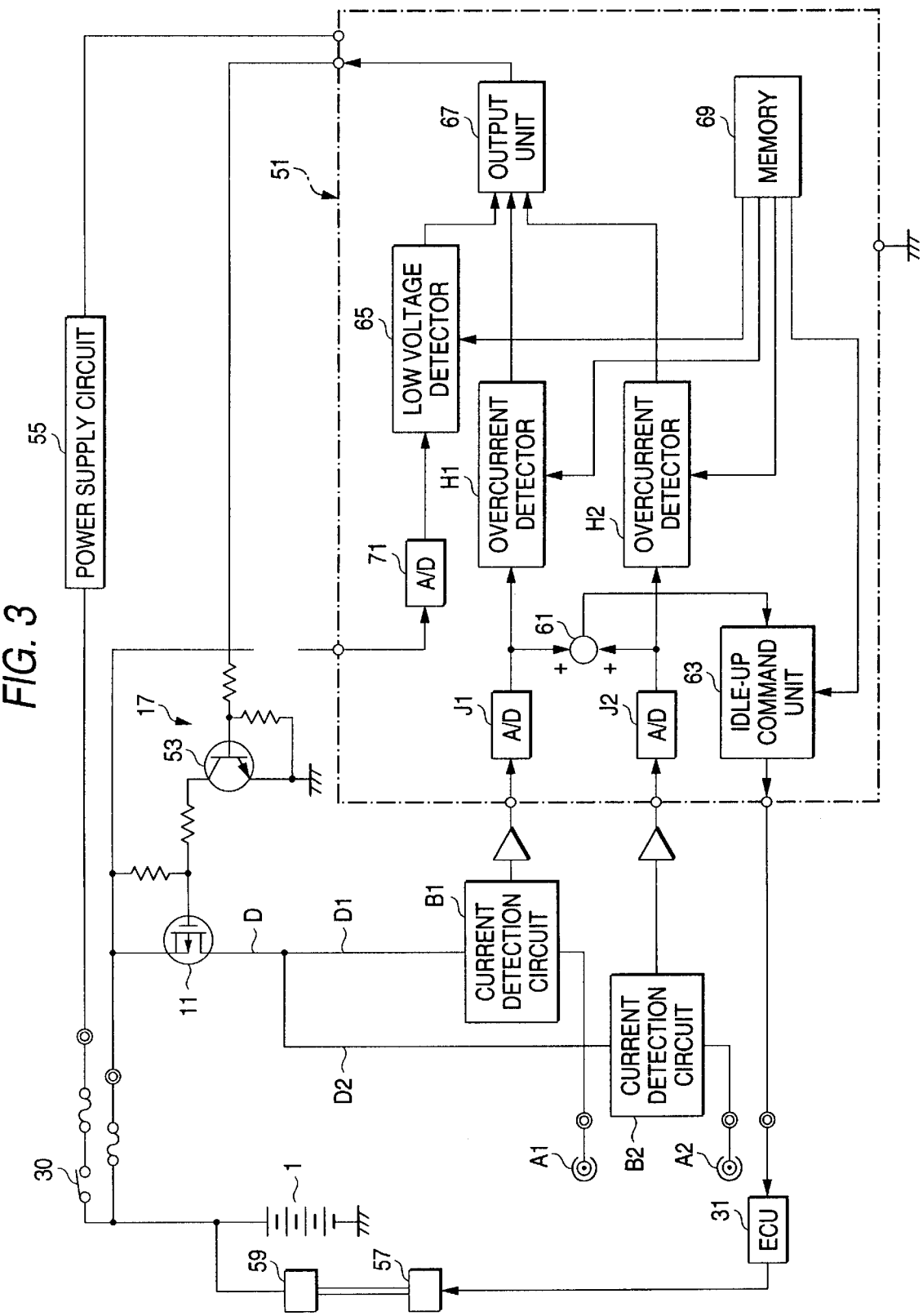
FIG. 3 is a block diagram illustrating a vehicle power supply monitoring apparatus according to a second embodiment of the invention.

FIG. 3 is a block diagram illustrating a power supply monitoring apparatus for vehicle according to a second embodiment of the present invention. In this embodiment, the power supply monitoring apparatus is characterized by providing, for a microcomputer 51, the functions of the overcurrent detection circuits C1 to Cm, the idle-up command circuit 13 and the low voltage detection circuit 15 in the first embodiment. The other sections are substantially the same as those in the first embodiment.

An explanation will now be given for the arrangement whereby two power supply outlets A1 and A2 are provided. While in this embodiment, a field-effect transistor (FET) is employed as a cutoff device 11, a relay switch may also be employed. The cutoff device 11 is driven by a drive circuit 17 that includes a transistor 53. Power is supplied to the microcomputer 51 by a power supply circuit 55 that is connected via an accessory switch 30 to a battery 1. In FIG. 3, an engine 57 and an alternator 59 are also provided.

The microcomputer 51 mainly comprises a plurality (two in this embodiment) of overcurrent detectors (first command units) H1 and H2, which are provided for corresponding current detection circuits B1 and B2; an adder 61; an idle-up command unit 63; a low voltage detector 65; an output unit 67; and a memory 69.

A plurality of first and other reference current values that are used as references for determination of an overcurrent, and first permitted times that correspond to the individual first reference current values are stored in advance in the memory 69. In addition, a second reference current value, which is used as a reference when an idle-up determination is being made, and a second permitted time, which corresponds to the second reference current value, are stored in advance in the memory 69. Furthermore, a third reference voltage value, which is used as a reference when a reduction in the output voltage of the battery 1 is being determined, and a corresponding third permitted time are stored in advance. The first and the second reference current values, the reference voltage value and the first to the third permitted times are designated in the same manner as in the first embodiment.

The overcurrent detectors H1 and H2 receive signals from the corresponding current detection circuits B1 and B2 via A/D converters J1 and J2, and sequentially detect the values of the currents that flow through the power supply outlets A1 and A2. The overcurrent detectors H1 and H2 compare the detected current values with the first reference current values that are stored in the memory 69. When the current values equal or exceed one of the first reference current values, the count of the elapsed time is begun.

While the overcurrent detectors H1 and H2 are counting the elapsed time, they determine whether the elapsed time equals or exceeds the first permitted time that is stored in the memory 69 and that corresponds to the pertinent first reference current value. When the elapsed time equals or exceeds the first permitted time, a command to turn off the FET 11 is issued to the output unit 67, which will be described later. Further, when before the elapsed time equals or exceeds the corresponding first permitted time, the current value falls until it is lower than the pertinent first reference current value, the counting operation is halted and the count value is reset.

The adder 61 receives the signals from the current detection circuits B1 and B2 via the A/D converters J1 and J2, and adds the values of the currents that flow through the power supply outlets A1 and A2 and transmits the resultant value to the idle-up command unit 63.

Through the adder 61, the idle-up command unit 63 sequentially identifies the sum of the values of currents that flow through the power supply outlets A1 and A2, and compares the total current value with the second reference current value stored in the memory 69. When the total current value equals or exceeds the second reference current value, the count of the elapsed time is begun.

While the idle-up command unit 63 is counting the elapsed time, it determines whether the elapsed time equals or exceeds the second permitted time stored in the memory 69. When the elapsed time equals or exceeds the second permitted time, the idle-up command unit 63 outputs to the engine control unit 31 an idle-up command instructing an idle-up at a predetermined level. When the total current value is lower than the second reference current value before the elapsed time equals or exceeds the second permitted time, the counting operation is halted and the count value is reset.

Based on the signal received from the A/D converter 71, which is connected along a power feeding path D upstream of the FET 11, the low voltage detector 65 sequentially examines the output voltage value of the battery 1, and compares the output voltage value with the reference voltage value that is stored in the memory 69. When the output voltage value equals or exceeds the reference voltage value, the count of the elapsed time is begun.

While the low voltage detector 65 is counting the elapsed time, it determines whether the elapsed time equals or exceeds the third permitted time that is stored in the memory 69. When the length of the elapsed time exceeds the third permitted time, the low voltage detector 65 transmits a command to the output unit 67, which will be described later, to turn off the FET 11. When before the elapsed time equals or exceeds the third permitted time, the output voltage value falls until it is lower than the reference voltage value, the counting operation is halted and the count value is reset.

Under normal conditions wherein no overcurrent occurs and the voltage of the battery 1 does not fall, the output unit 67 outputs a high-level signal in order to render the FET 11 on. When the output unit 67 receives a command from at least one of the overcurrent detectors H1 and H2 and the low voltage detector 65 to turn off the FET 11, the output unit 67 changes the level of the signal that is output from high to low. The condition wherein the output unit 67 outputs a low-level signal is maintained until, for example, the accessory switch 30 is turned off. Then, when the accessory switch 30 is again turned on, the output level is reset to high.

The signal from the output unit 67 is transmitted to the transistor 53 in the drive circuit 17. When the transistor 53 is rendered on or off as the level of the signal output by the output unit 67 is switched between high and low, the FET 11 is also rendered on or off, and accordingly, the power feeding path D is rendered conductive or nonconductive.

Figure 4:
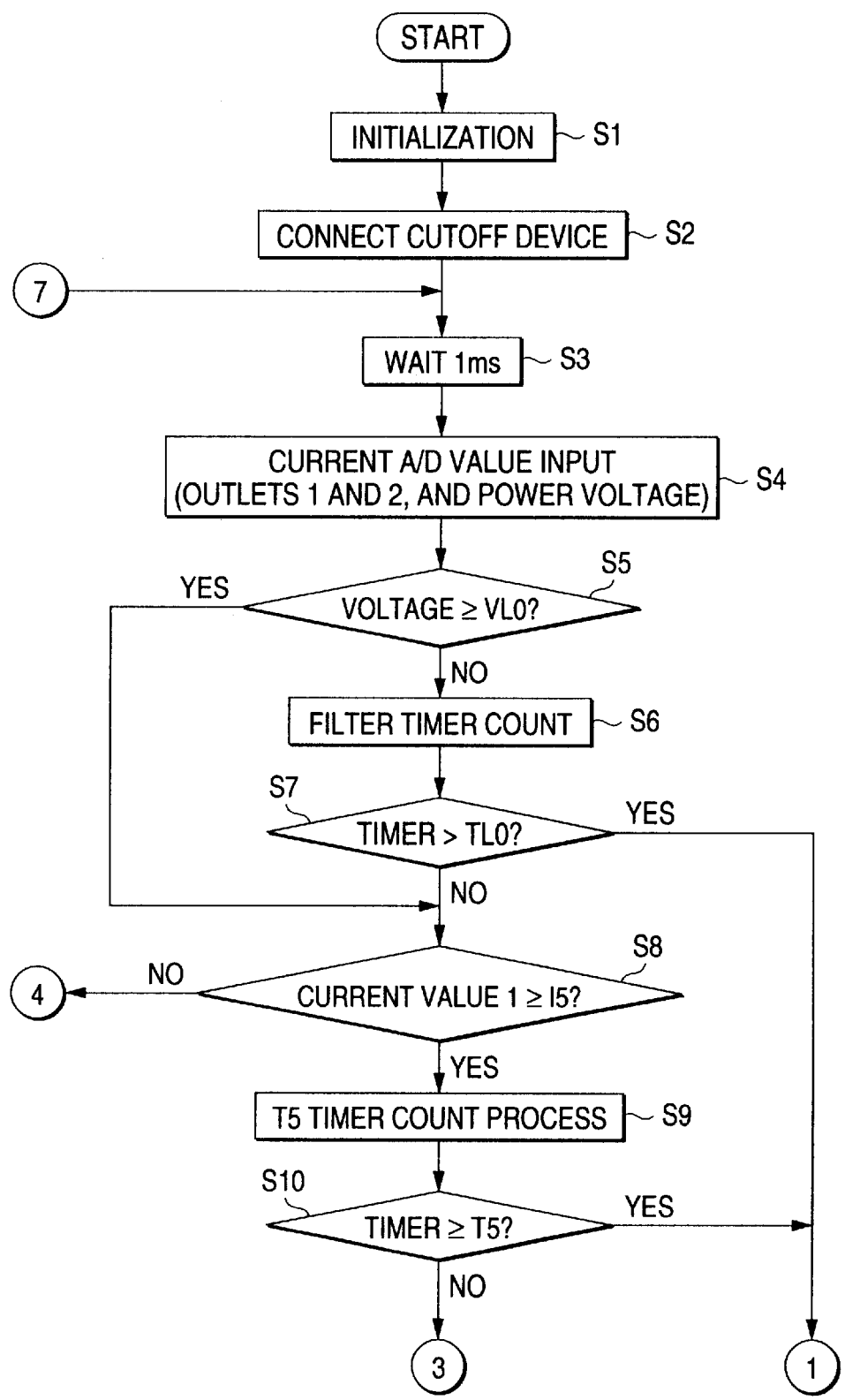
FIG. 4 is a flowchart showing the processing performed by a microcomputer provided for the power supply monitoring apparatus in FIG. 3.
Figure 5:
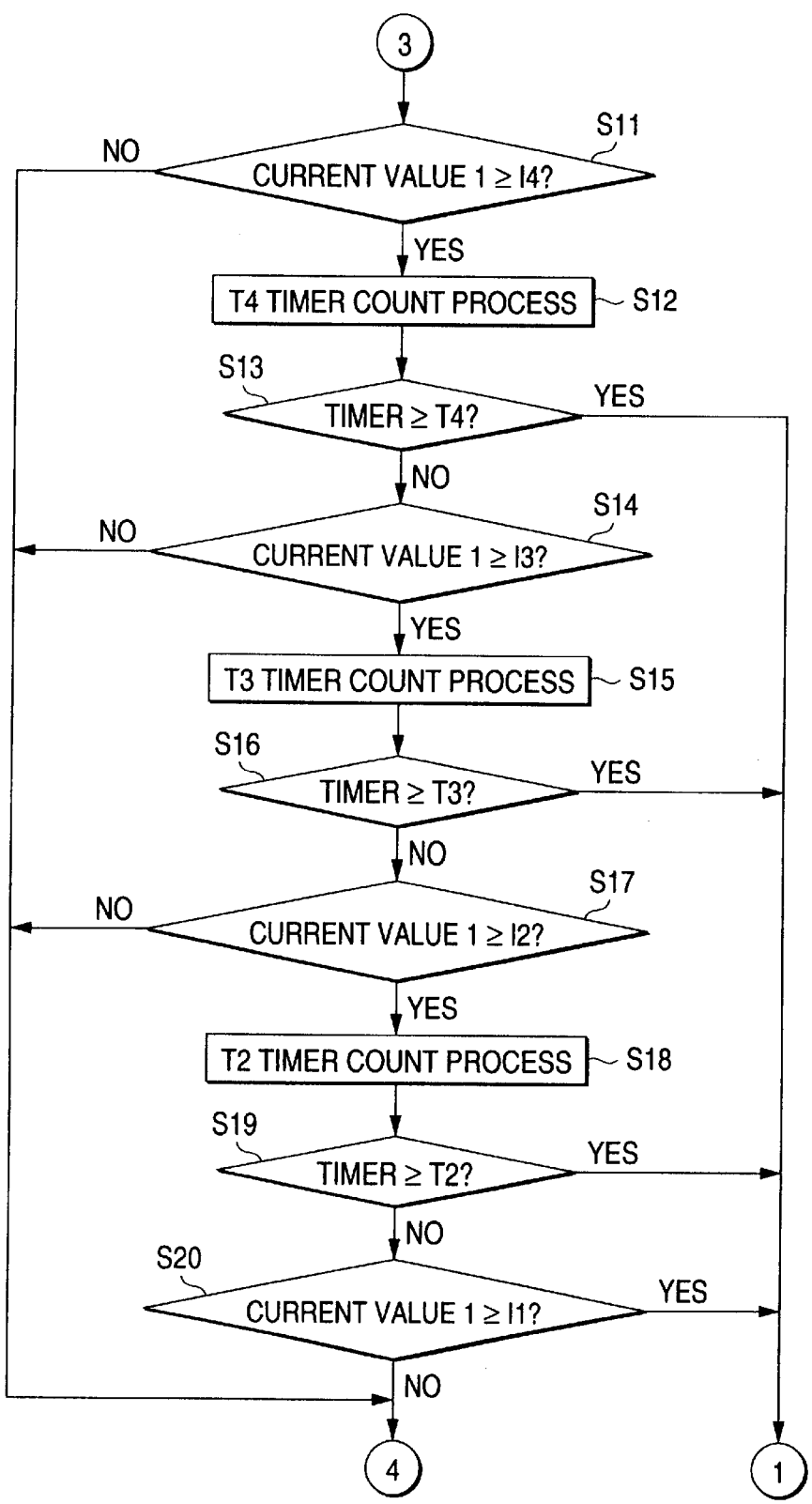
FIG. 5 is a flowchart showing the processing performed by the microcomputer provided for the power supply monitoring apparatus in FIG. 3.
Figure 6:
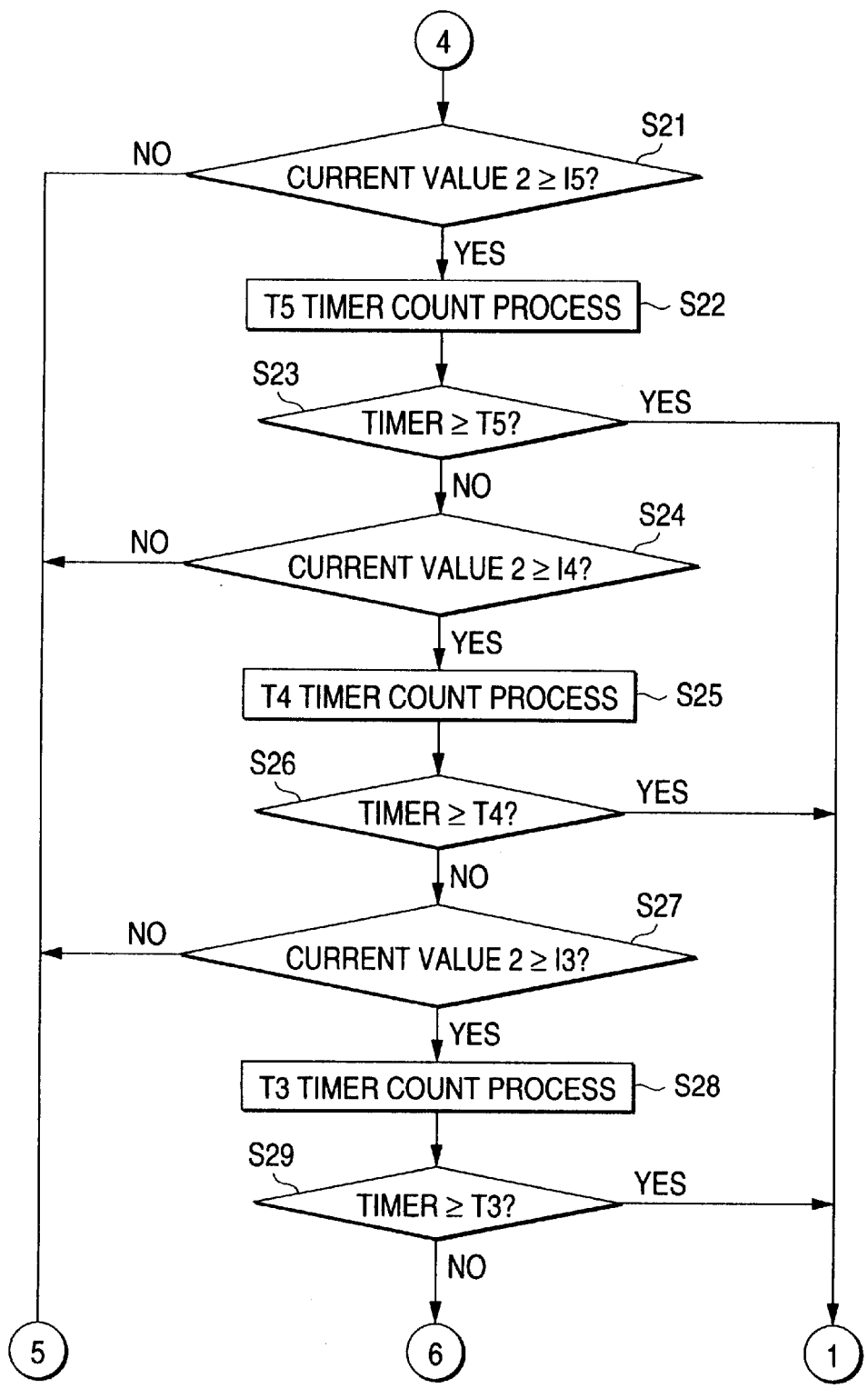
FIG. 6 is a flowchart showing the processing performed by the microcomputer provided for the power supply monitoring apparatus in FIG. 3.
Figure 7:
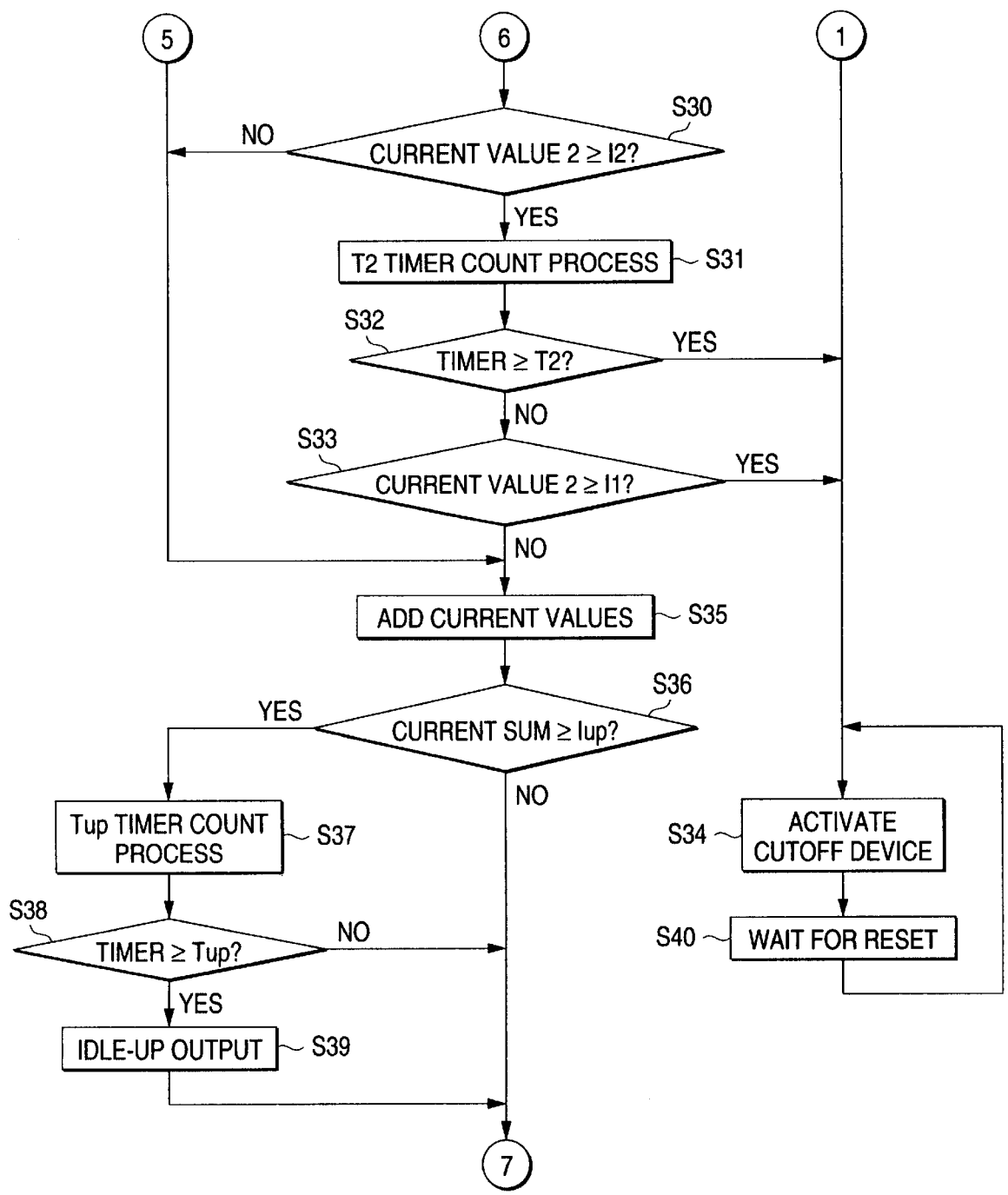
FIG. 7 is a flowchart showing the processing performed by the microcomputer provided for the power supply monitoring apparatus in FIG. 3.

FIGS. 4 to 6 are flowcharts for explaining the processing performed by the microcomputer 51. For this processing, reference current values I1 to I5 and permitted times T1 to T5 in Table 1 and FIG. 2 are set as reference current values and permitted times that are used when determining the existence of an overcurrent.

At step S1, when the microcomputer 51 is powered on by turning on the accessory switch 30, an initialization process is preformed. A high-level signal is output by the output unit 67, and at step S2, the FET 11 is turned on and the power feeding path D is rendered conductive. At step S3, a time-waiting process is performed for a period of 1 ms.

At step S4, the current values at the power supply outlets A1 and A2 and the output voltage value of the battery 1 are transmitted via the A/D converters J1, J2 and 71 to the overcurrent detectors H1 and H2 and the low voltage detector 65.

At steps S5 to S7, the low voltage detector 65 determines whether the output voltage of the battery 1 has been reduced. At step S5, a check is performed to determine whether the output voltage of the battery 1 equals or exceeds the reference voltage value VL0. When the output voltage equals or exceeds the reference voltage value VL0, program control moves to step S8. When the output voltage is less than the reference voltage value VL0, at step S6 the count of the elapsed time is begun, and program control goes to step S7. When it is ascertained at step S5 that the output voltage of the battery 1 is lower than the reference voltage value VL0, and that the low voltage detector 65 is counting the elapsed time, the elapsed time count is canceled.

At step S7, a check is performed to determine whether the elapsed time exceeds the permitted time TL0 that corresponds to the reference voltage value. When the elapsed time exceeds the permitted time, it is ascertained that the output voltage of the battery 1 has been reduced excessively, and a command to turn off the FET 11 is issued to the output unit 67 by the low voltage detector 65, Program control then goes to step S34, whereat the level of the signal output by the output unit 67 is changed from high to low, the FET 11 is turned off and the power feeding path D is rendered nonconductive, and to step S40, whereat the reset waiting state is set. But when the count acquired is for an elapsed time that is less than or that equals the permitted time TL0, the elapsed time count is continued and program control advances to step S8.

At steps S8 to S20, the overcurrent detector H1 determines whether the value (current value 1) of a current flowing through the power supply outlet A1 is an overcurrent value.

At step S8, a check is performed to determine whether the current value 1 equals or exceeds the reference current value I5. When the current value 1 equals or exceeds the reference current value I5, at step S9 a count is begun for the permitted time T5 that corresponds to the reference current value I5 and program control advances to step S10. But when the current value 1 is smaller than the reference current value I5, program control advances to step S21. Before this, however, when it is ascertained at step S8 that the current value 1 is smaller than the reference current value I5 and that the counting process has previously been initiated at step S9 by the overcurrent detector H1, the counting process is canceled.

At step S10, a check is performed to determine whether the elapsed time for which the count was begun at step S9 equals or exceeds the permitted time T5. When the time equals or exceeds the permitted time T5, it is ascertained that the current value 1 is an overcurrent value, and an instruction to turn off the FET 11 is transmitted by the overcurrent detector H1 to the output unit 67. Program control then moves to step S34. When the time counted is shorter than the permitted time T5, the counting process is continued and program control advances to step S11.

At steps S11 to S13, S14 to S16 and S17 to S19, as well as at steps S8 to S10, when the current value 1 equals or exceeds the reference current values I2 to I4, the count of the elapsed time corresponding to the permitted times T1 to T4 is begun. But when the time counted equals or exceeds the permitted times T1 to T4, an instruction to turn off the FET 11 is transmitted to the output unit 67 by the overcurrent detector H1 and program control goes to step S34, whereat the FET 11 is turned off.

At step S20, a check is performed to determine whether the current value 1 equals or exceeds the reference current value I1. When the current value 1 equals or exceeds the reference current value I1, since the corresponding permitted time T1 is set to zero, the count for the elapse time is not initiated, and an instruction to turn off the FET 11 is transmitted to the output unit 67 by the overcurrent detector H1. Then, at step S34, the FET 11 is turned off.

At steps S21 to S33, as well as at steps S8 to S20, a check is performed to determine whether the value (current value 2) of a current flowing through the power supply outlet A2 is an overcurrent value.

At steps S35 to S39, the idle-up command unit 63 determines whether it should perform the idle-up process. At step S35, the adder 61 adds the current values 1 and 2 and program control advances to step S36, whereat a check is performed to determine whether the sum of the current values 1 and 2 equals or exceeds the second reference current value Iup. When the sum equals or exceeds the reference current value Iup, at step S37 the counting process is initiated for a count for the second permitted time Tup, and program control thereafter moves to step S39. When the sum of the current values 1 and 2 is smaller than the reference current value Iup, program control returns to step S3 and the process at steps S3 to S39 is repeated. In addition, however, when at step S36 the sum of the current values is determined to be smaller than the reference current value Iup and the counting process was previously initiated for the count for the permitted time Tup, the counting process is canceled.

At step S38, a check is performed to determine whether the time for which the count was initiated at step S37 equals or exceeds the second permitted time Tup. When the time equals or exceeds the second permitted time Tup, it is ascertained that the power being generated is insufficient and that the idle-up process is required. Thereafter, program control advances to step S39, whereat the idle-up command unit 63 issues the idle-up command to the engine control unit 31 to perform the idle-up process for the engine 57. Thus, the amount of power generated by the alternator 59 is increased, and program control thereafter returns to step S3. When, however, it is determined that the time counted is shorter than the second permitted time Tup, the counting process is continued and program control returns to step S3.

To recover the power feeding path D that is rendered nonconductive at step S34, the accessory switch 30 is turned off and is turned on again, so that the processing performed in accordance with the flowchart is resumed. Thus, the FET 11 is turned on, and the power feeding path D is rendered conductive.

As is described above, the same effects as are obtained by the first embodiment are also obtained by this embodiment, while the microcomputer 51 determines whether an overcurrent has occurred, whether the idle-up process is required, and whether the output voltage of the battery 1 has been reduced. Therefore, it is easy to cope with changes in the number of power supply outlets A1 to Am, and in the number and the values of the first reference current values and the first permitted times.

In the above individual embodiments, the on state of the cutoff device 11 can be recovered by turning the accessory switch 30 off and on again. Or a special switch maybe provided, and the on state of the cutoff device 11 may be recovered by the manipulation of that switch.

Further, in these embodiments, the current carried by the power feeding path D is interrupted without the user being notified. An alternate process may be provided, however, by mounting a power-off notification indicator lamp at the power supply outlets A1 to Am or on an instrument panel, so that a user can be immediately notified when the current carried by the power feeding path D is interrupted. Either this, or a warning buzzer may be installed to notify a user that such an interruption has occurred.

According to the invention, the range within which an overcurrent has occurred is determined by using multiple reference current values and multiple permitted times that respectively correspond to the reference current values. Therefore, the battery can be effectively protected from overcurrents occurring within a large range extending from one that has a comparatively small value to one that has a comparatively large value. Furthermore, within a permitted range for a battery, a large current, such as a motor lash current, can be supplied, even though only for a brief period of time, so that the imposition of limitations on the employment of an electric appliance can be avoided within a range wherein the protection provided for a battery is not degraded.

What is claimed is:

1. A power supply monitoring apparatus for vehicle, which monitors the state of a power supplied by a battery to an electric appliance, comprising:

a cutoff unit, which is located along a power feeding path between the battery and the electric appliance, for interrupting a current flowing along the power feeding path;

a current detector for detecting the value of a current flowing across the electric appliance; and a first command unit, for which a plurality of different reference current values and a plurality of corresponding permitted times are set, for detecting a condition wherein the value of the current detected by said current detector equals or exceeds at least one of the plurality of reference current values, is continued for a period that equals or exceeds ones of the plurality of permitted times that corresponds to the reference current value, and for outputting a command to said cutoff unit to interrupt the current flowing along the power feeding path.

2. The power supply monitoring apparatus according to claim 1, further comprising: an idle-up command unit, for determining whether the value of the current detected by said current detector equals or exceeds an idle-up reference value that has been decided in advance, and for outputting an idle-up command to an engine control unit.

3. The power supply monitoring apparatus according to claim 2, wherein a plurality of connectors, to each of which the electric appliance is to be connected, are located along power feeding paths downstream of said cutoff unit; wherein one current detector and one first command unit are paired and provided for each of the connectors, or for a predetermined number of the connectors; and wherein, when the values of the currents detected by said current detectors of said paired devices are added together and the total current value that is obtained equals or exceeds the idle-up reference value, said idle-up command unit outputs said idle-up command.

4. The power supply monitoring apparatus according to claim 3, wherein the connectors are power supply outlets to which electric appliance power reception connection plugs are detachably connected.

5. The power supply monitoring apparatus according to claim 1, further comprising: a second command unit, for determining whether the value of a voltage upstream of said cutoff unit along the power feeding path is less than or equals a reference voltage value that has been decided in advance, and for outputting a command to said cutoff unit to interrupt the current flowing along the power feeding path.

* * * * *